(12) United States Patent
Jinno (10) Patent No.: US 6,798,672 B2
(45) Date of Patent: Sep. 28, 2004

(54) POWER CONVERTER MODULE WITH AN ACTIVE SNUBBER CIRCUIT

(75) Inventor: Masahito Jinno, Kaohsiung Hsien (TW)

(73) Assignee: Potrans Electrical Corporation, Keelung (TW)

( * ) Notice: Subject to any disclaimer, the term of this patent is extended or adjusted under 35 U.S.C. 154(b) by 28 days.

(21) Appl. No.: 10/370,117

(22) Filed: Feb. 19, 2003

(65) Prior Publication Data

US 2004/0085050 A1 May 6, 2004

(30) Foreign Application Priority Data

Nov. 4, 2002 (TW) ........................................ 91132517 A (51) Int. Cl.[7] ............................ H02M 3/335; G05F 1/40
(52) U.S. Cl. ............................ 363/20; 363/97; 323/271; 323/272
(58) Field of Search ................................ 363/21.4, 21.9, 363/20, 16, 17, 97, 98, 95, 127, 131; 323/222, 271, 272, 266, 267, 282

(56) References Cited

U.S. PATENT DOCUMENTS

| | | | | |
|---|---|---|---|---|
| 5,502,628 A | * | 3/1996 | Arakawa | 363/20 |
| 5,521,807 A | * | 5/1996 | Chen et al. | 363/21.04 |
| 5,552,695 A | * | 9/1996 | Schwartz | 323/271 |
| 5,570,276 A | * | 10/1996 | Cuk et al. | 363/16 |
| 5,862,043 A | * | 1/1999 | Youn et al. | 363/21.04 |
| 6,249,444 B1 | * | 6/2001 | Cross | 363/21.03 |
| 6,346,592 B1 | * | 2/2002 | Sæthre et al. | 526/319 |

* cited by examiner

*Primary Examiner*—Rajnikant B. Patel
(74) *Attorney, Agent, or Firm*—Darby & Darby (57) ABSTRACT

A power converter module includes a power transformer, a first power switch, and an active snubber circuit for recovering surge energy. The power transformer has a primary winding and a secondary winding adapted to be coupled electrically to a load. The primary winding has first and second terminals connected electrically and respectively to first and second nodes. The first power switch has a first switch terminal connected electrically to the second node, and a second switch terminal connected electrically to a third node. The first and third nodes are adapted to be coupled electrically to a power source. The active snubber circuit includes a snubber diode, a snubber capacitor, a snubber transformer, and a second power switch.

17 Claims, 10 Drawing Sheets

| n₄(μH) | 132 | 174.8 | 200 | 261 | 316 | 468 |
|---|---|---|---|---|---|---|
| Cs (nF) | 28.8 | 18.2 | 18.2 | 13.5 | 10 | 8.2 |
| η(%) | 87.57 | 88.2 | 88.5 | 88.16 | 89.41 | 88.45 |

F I G. 12

F I G. 13

F I G. 14

F I G. 15

F I G. 16

F I G. 17

POWER CONVERTER MODULE WITH AN ACTIVE SNUBBER CIRCUIT

CROSS-REFERENCE TO RELATED APPLICATION

This application claims priority of Taiwanese application no. 091132517, filed on Nov. 4, 2002.

BACKGROUND OF THE INVENTION

1. Field of the Invention

The invention relates to a power converter module, more particularly to a power converter module with an active snubber circuit.

2. Description of the Related Art

Figure 1:
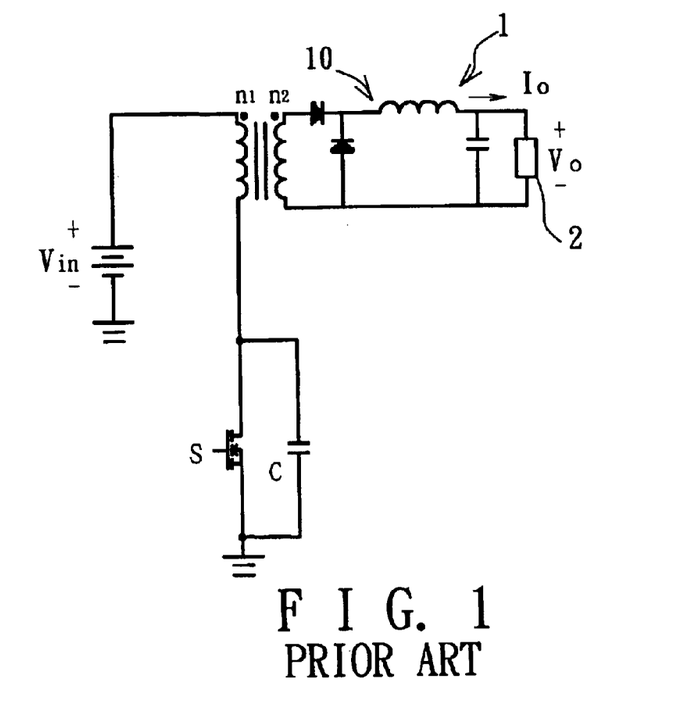
FIG. 1 is a schematic electrical circuit diagram of a conventional power converter module.
Figure 2:
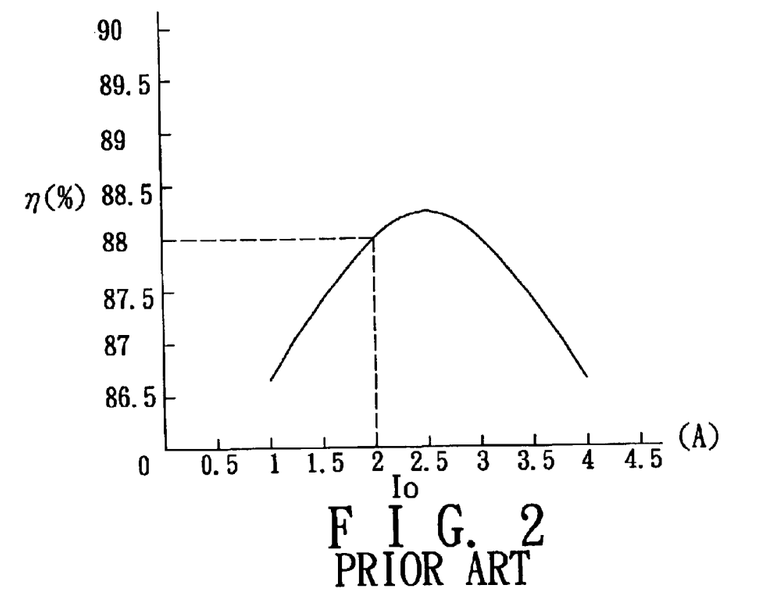
FIG. 2 is a plot illustrating conversion efficiency of the conventional power converter module for different values of output current.

A conventional power converter module 1 is shown in FIG. 1. The power converter module 1 includes a power transformer that has primary and secondary windings (n1) (n2), a power switch (S) connected in series with the primary winding (n1), a capacitor (C) connected across the power switch (S), and a forward rectifier 10 that interconnects the secondary winding (n2) to a load 2. The series combination of the primary winding (n1) and the power switch (S) is connected in parallel to a DC power source (Vin). When the power switch (S) operates at a high switching frequency, while the capacitor (C) is capable of absorbing voltage surges at the instant of switch closing, the surge energy is neither regenerated to the DC power source (Vin) nor provided to the load 2, which limits the conversion efficiency of the power converter module 1. With further reference to FIG. 2, based on experimental results, under the condition that DC power source (Vin) is 24V and load voltage (Vo) is 12V, the conversion efficiency ($\eta$) of the conventional power converter module 1, when output current (Io) is 2 A, is only 88%.

SUMMARY OF THE INVENTION

Therefore, the object of the present invention is to provide a power converter module that can regenerate surge energy so as to improve the conversion efficiency.

According to the present invention, a power converter module comprises a power transformer, a first power switch, and an active snubber circuit. The power transformer has a primary winding and a secondary winding adapted to be coupled electrically to a first load. The primary winding has first and second terminals connected electrically and respectively to first and second nodes. The first power switch has a first switch terminal connected electrically to the second node, and a second switch terminal connected electrically to a third node. The first and third nodes are adapted to be coupled electrically to a power source. The active snubber circuit serves to recover surge energy, and includes a snubber diode, a snubber capacitor, a snubber transformer, and a second power switch. The snubber diode has a first diode terminal connected electrically to the first node, and a second diode terminal connected electrically to a fourth node. The snubber capacitor has a first capacitor terminal connected electrically to the second node, and a second capacitor terminal connected electrically to the fourth node. The snubber transformer has a primary winding and a secondary winding adapted to be coupled electrically to a second load. The primary winding has a first terminal connected electrically to the fourth node, and a second terminal connected electrically to a fifth node. The second power switch has a first switch terminal connected electrically to the fifth node, and a second switch terminal connected electrically to the third node.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 3:
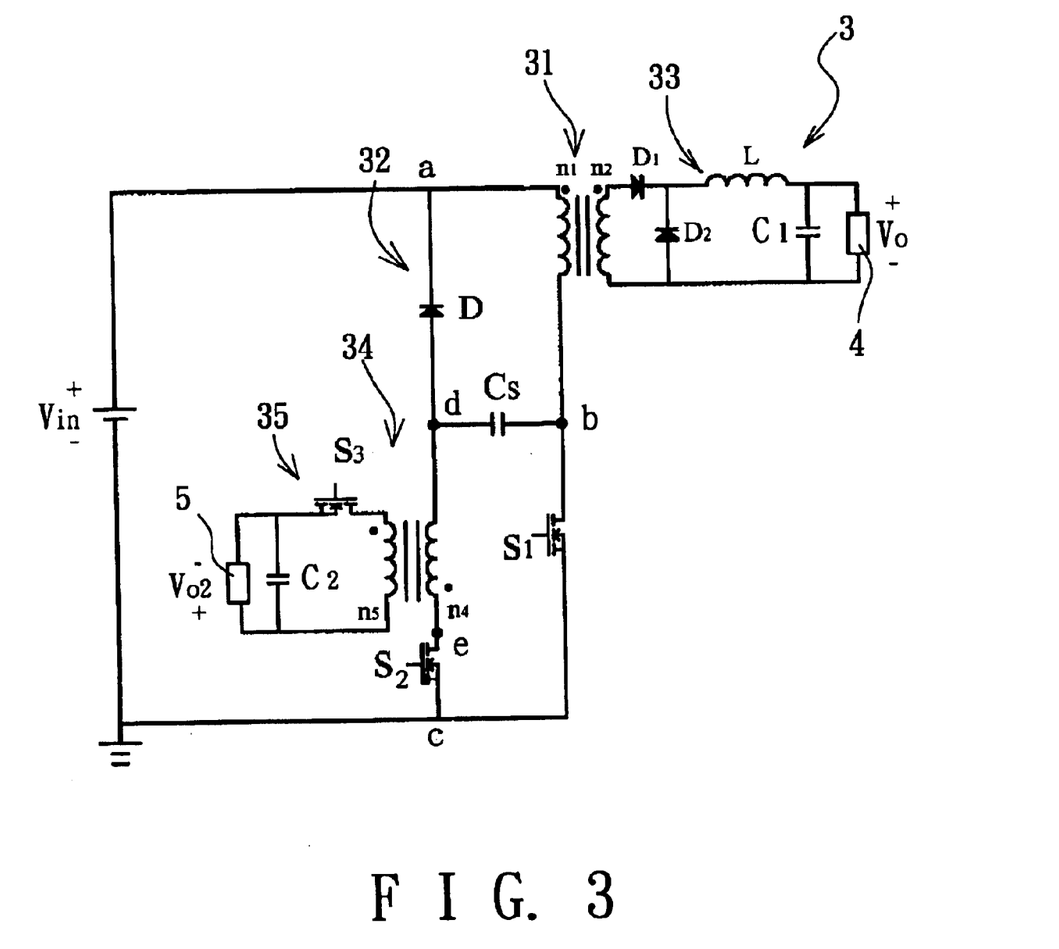
FIG. 3 is a schematic electrical circuit diagram of the first preferred embodiment of a power converter module according to the present invention.

Referring to FIG. 3, the first preferred embodiment of a power converter module 3 according to the present invention is shown to include a power transformer 31, a first power switch (S1), and an active snubber circuit 32.

The power transformer 31 has a primary winding (n1) that has first and second terminals connected electrically and respectively to first and second nodes (a), (b), and a secondary winding (n2) that has first and second terminals to be coupled electrically to a first load 4.

The first power switch (S1) has a first switch terminal connected electrically to the second node (b), and a second switch terminal connected electrically to a third node (c). The first and third nodes (a), (C) are coupled electrically and respectively to positive and negative terminals of a DC power source (Vin).

The active snubber circuit 32 serves to recover surge energy, and includes a snubber diode (D), a snubber capacitor (Cs), a snubber transformer 34, and a second power switch (S2). The snubber diode (D) has a first diode terminal (i.e., a cathode terminal) connected electrically to the first node (a) and a second diode terminal (i.e., an anode terminal) connected electrically to a fourth node (d). The snubber capacitor (Cs), which is a voltage-clamping capacitor, has a first capacitor terminal connected electrically to the second node (b), and a second capacitor terminal connected electrically to the fourth node (d). The snubber transformer 34 has a primary winding (n4) that has a first terminal that is connected electrically to the fourth node (d), and a second terminal connected electrically to a fifth node (e), and a secondary winding (n5) that has first and second terminals to be coupled electrically to a second load 5. The second power switch (S2) has a first switch terminal that is connected electrically to the fifth node (e), and a second switch terminal connected electrically to the third node (c).

In this embodiment, the power converter module 3 further comprises a forward rectifier 33 that interconnects the first and second terminals of the secondary winding (n2) of the power transformer 31 to the first load 4. The forward rectifier 33 includes a first diode (D1), an output inductor (L) connected in series with the first diode (D1), a second diode (D2), and an output capacitor (C1). The series combination of the first diode (D1) and the output inductor (L) is connected electrically between the first terminal of the secondary winding (n2) of the power transformer 31 and the first load 4. The second diode (D2) is connected electrically between the first diode (D1) and the output inductor (L), and between the second terminal of the secondary winding (n2) of the power transformer 31 and the first load 4. The output capacitor (C1) is connected electrically across the first load 4.

The active snubber circuit 32 further includes a fly back rectifier 35 that interconnects the first and second terminals of the secondary winding (n5) of the snubber transformer 34 to the second load 5. The fly back rectifier 35 includes a third power switch (S3) and a load capacitor (C2). The third power switch (S3) is connected between the first terminal of the secondary winding (n5) of the snubber transformer 34 and the second load 5. The load capacitor (C2) is connected electrically across the second load 5.

In this embodiment, the first, second and third power switches (S1, S2, S3) are concurrently controllable such that the first and second power switches (S1, S2) are closed when the third power switch (S3) is opened, and such that the first and second power switches (S1, S2) are opened when the third power switch (S3) is closed. Preferably, the first, second, and third power switches (S1, S2, S3) are MOSFET transistor switches.

The power converter module 3 having the aforesaid structure, at an instant when the first and second power switches (S1, S2) are opened, a high voltage surge or counter-electromotive force is generated at the primary winding (n1) of the power transformer and is absorbed by the snubber capacitor (Cs). Accordingly, the first and second power switches (S1, S2) are protected from damage that may arise from the voltage surge and, at the same time, energy is stored. When the first and second power switches (S1, S2) are subsequently closed, the stored energy is transferred to and stored in the primary winding (n4) of the snubber transformer 34, which is eventually delivered to the second load 5 through the fly back rectifier 35 when the third power switch (S3) is closed. A detailed operation of the first preferred embodiment is explained hereinafter with reference to FIGS. 4 to 7.

Figure 4:
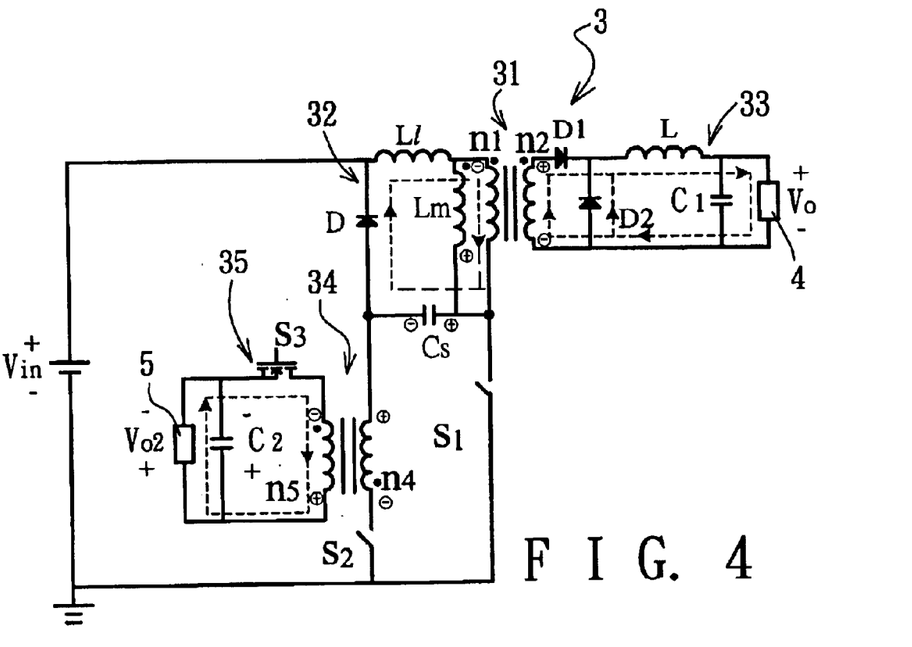
FIGS. 4 to 7 are schematic electrical circuit diagrams of the first preferred embodiment in states of operation.

As shown in FIG. 4, at the instant when the first and second power switches (S1, S2) are opened and the third power switch (S3) is closed, a circuit loop is formed from the primary winding (n1) of the power transformer 31, the snubber capacitor (Cs) and the snubber diode (D) so that energy from leakage inductance (L1) of the primary winding (n1) of the power transformer 31 is transferred to and is stored in the snubber capacitor (Cs) while energy stored in magnetizing inductance (Lm) is released to the first load 4. At this point, since the first diode (D1) of the forward rectifier 33 at the secondary winding (n2) of the power transformer 31 does not have enough time to cut off, part of output current flowing through the forward rectifier 33 still flows through the first diode (D1). At the same time, energy stored in the primary winding (n4) of the snubber transformer 34 is released to the second load 5 through the fly back rectifier 35 at the secondary winding (n5) of the snubber transformer 34.

Figure 5:
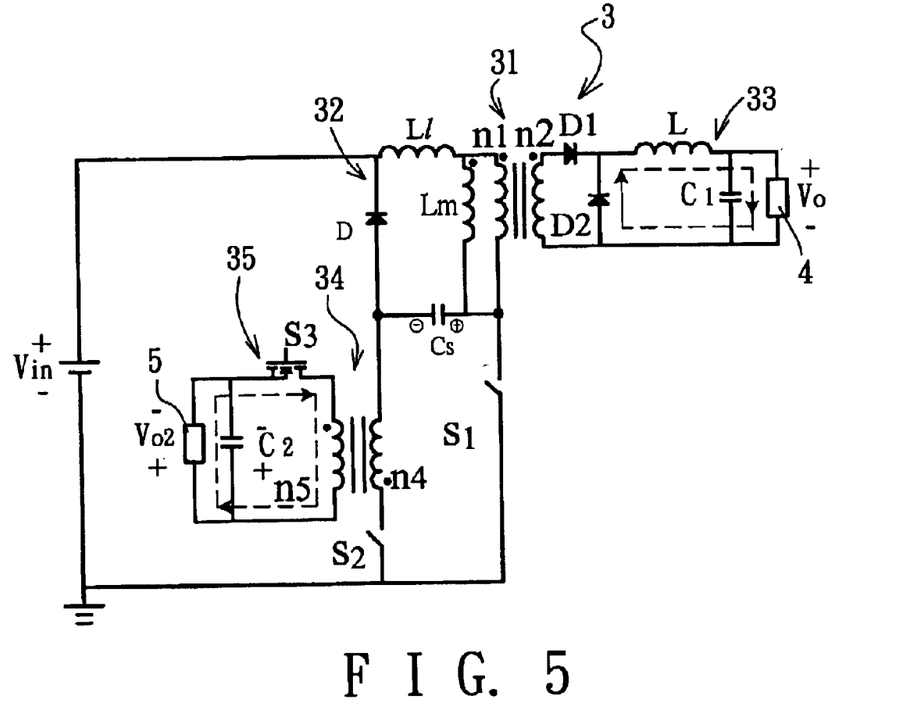

With reference to FIG. 5, when the transfer of the energy to the snubber capacitor (Cs) is completed, the first diode (D1) of the forward rectifier 33 at the secondary winding (n2) of the power transformer 31 is cut off, and the output current flowing through the forward rectifier 33 is gradually reduced.

Figure 6:
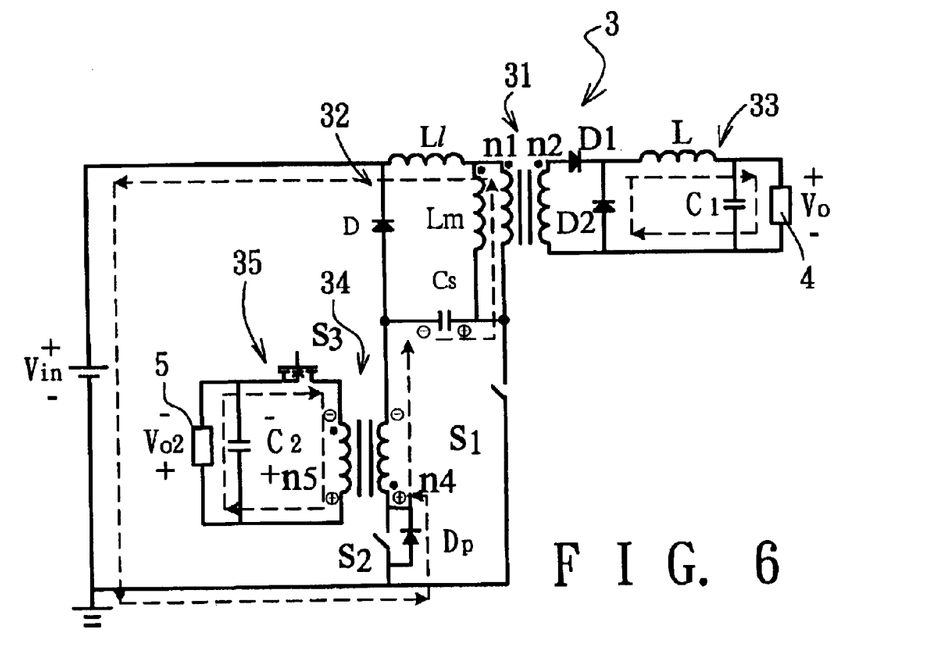

Shortly thereafter, referring now to FIG. 6, a circuit loop is established between the positive and negative terminals of the DC power source (Vin) through the primary winding (n1) of the power transformer 31, the snubber capacitor (Cs), the primary winding (n4) of the snubber transformer 34, and a parasitic diode (Dp) of the second power switch (S2). Through this circuit loop, the energy stored in the snubber capacitor (Cs) is regenerated to the DC power source (Vin), and is transferred and stored in the primary winding (n4) of the snubber transformer 34. At this point, a voltage is induced at the secondary winding (n2) of the power transformer 31 by the primary winding (n1) of the power transformer 31 to maintain the output current that is flowing through the forward rectifier 33 bounded by the second diode (D2), the output inductor (L) and the first load 4. At this time, the fly back rectifier 35 at the secondary winding (n5) of the snubber transformer 34 continues to provide the energy to the second load 5.

Figure 7:
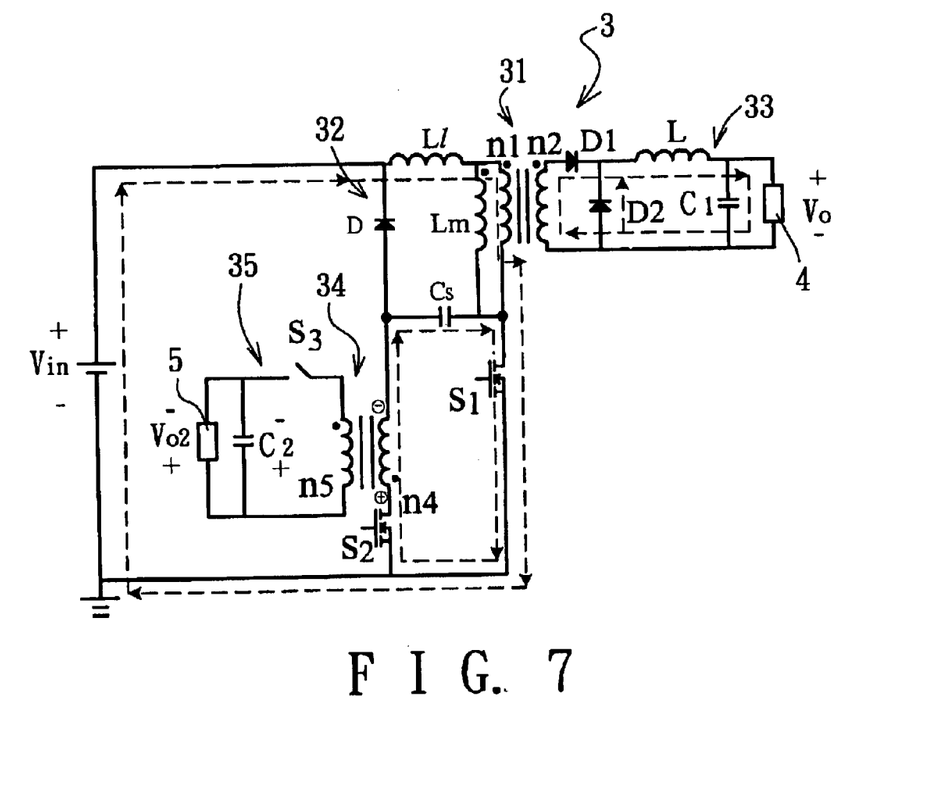

Subsequently, as illustrated in FIG. 7, when both the first and second power switches (S1, S2) are closed and the third switch (S3) is opened, a circuit loop is formed from the DC power source (Vin), the primary winding (n1) of the power transformer 31, and the first power switch (S1). The DC power source (Vin) energizes the primary winding (n1) of the power transformer 31, which causes the first diode (D1) at the secondary winding (n2) of the power transformer 31 to conduct current, charges the output inductor (L) and provides the energy to the first load 4. At this time, the output current flowing through the second diode (D2) diminishes until the second diode (D2) is turned off. There is another circuit loop formed from the snubber capacitor (Cs), the first power switch (S1), the second power switch (S2), and the primary winding (n4) of the snubber transformer (34) in which the energy stored in the snubber capacitor (Cs) is transferred to the primary winding (n4) of the snubber transformer 34. As such, when the first and second power switches (S1, S2) are opened and the third power switch (S3) is closed, the energy is released to the second load 5 through the fly back rectifier 35.

Figure 8:
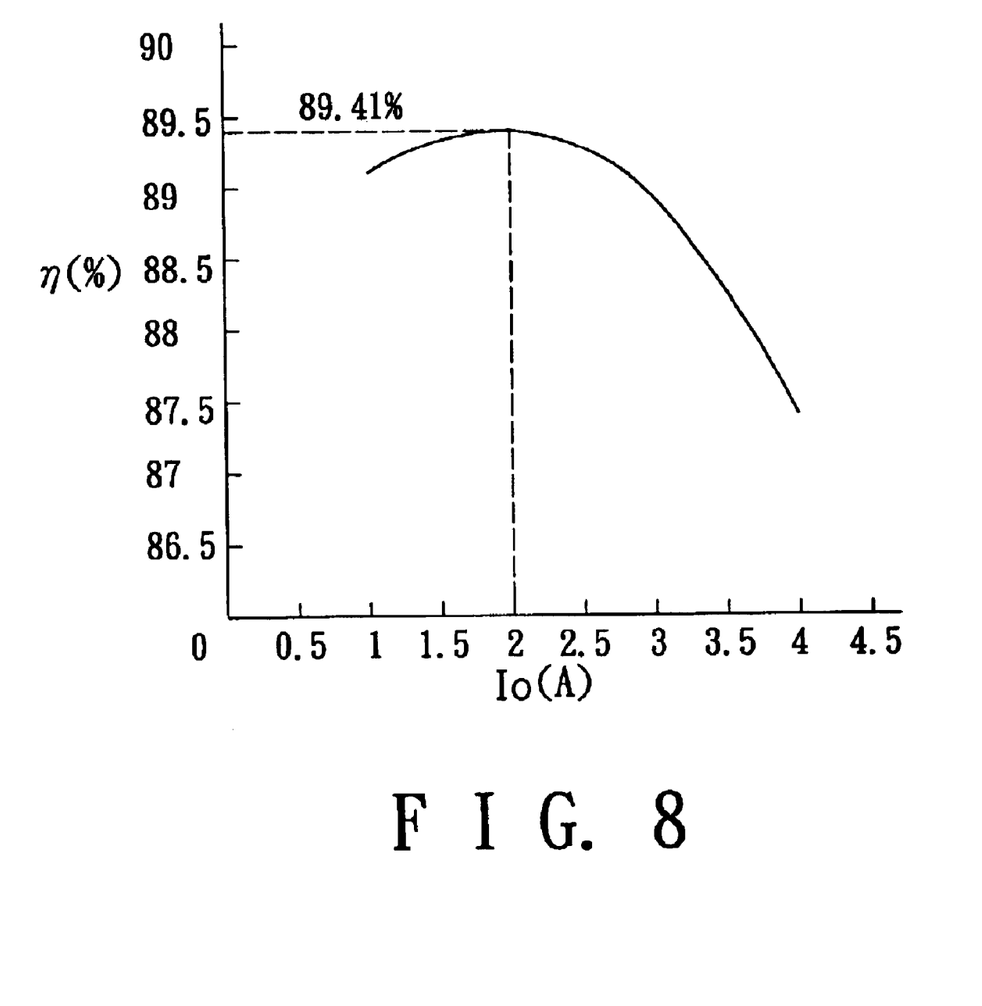
FIG. 8 is a plot illustrating conversion efficiency of the first preferred embodiment for different values of output current.
Figure 9:
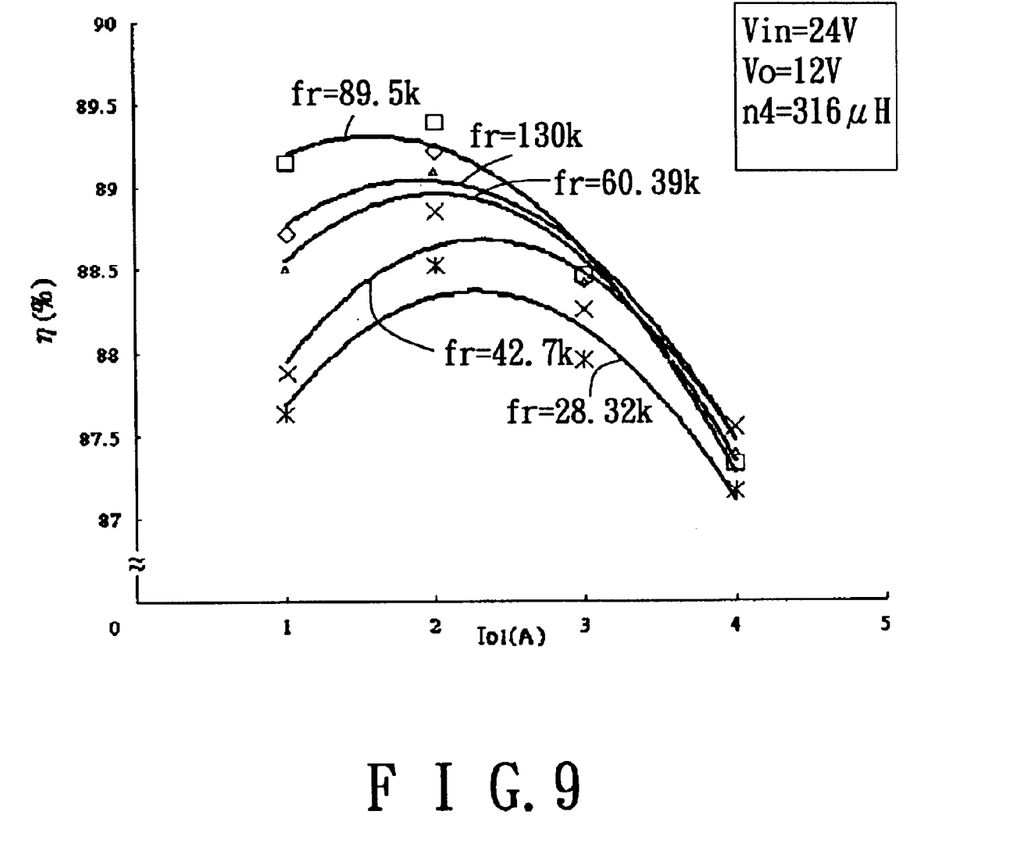
FIG. 9 is a plot of conversion efficiency vs. output current characteristic curves of the first preferred embodiment for different resonant frequencies.
Figure 10:
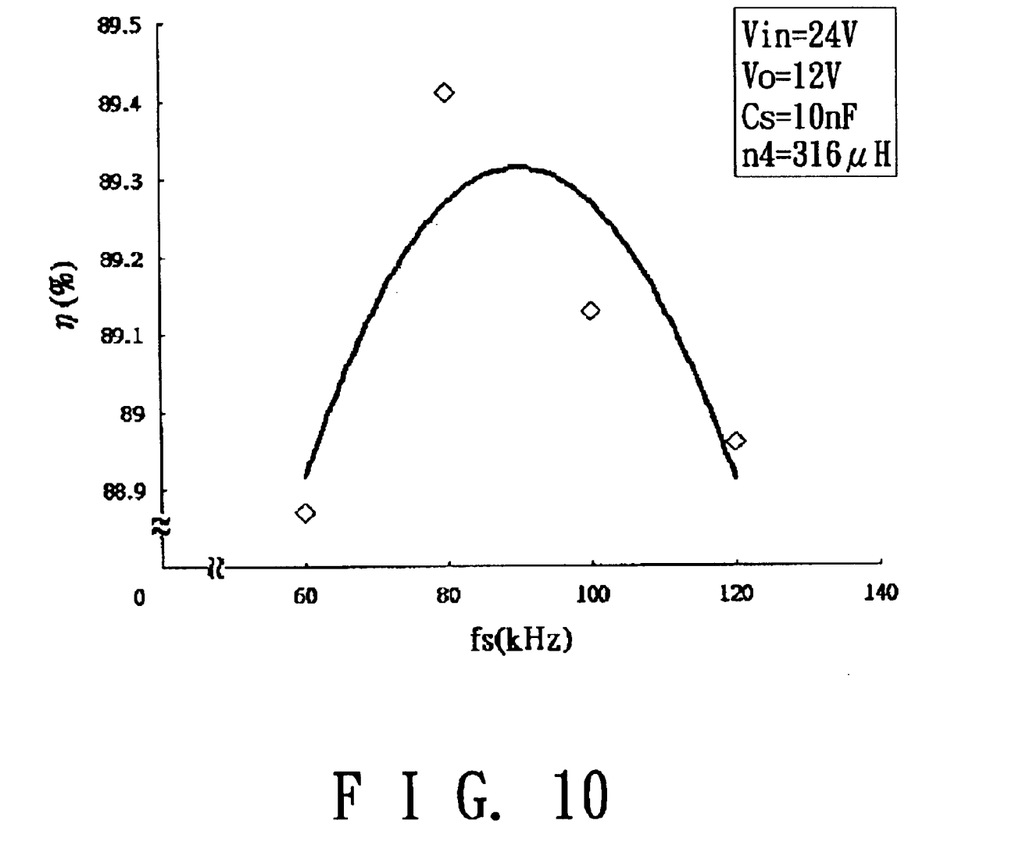
FIG. 10 is a plot illustrating conversion efficiency of the first preferred embodiment for different values switching frequency.
Figure 11:
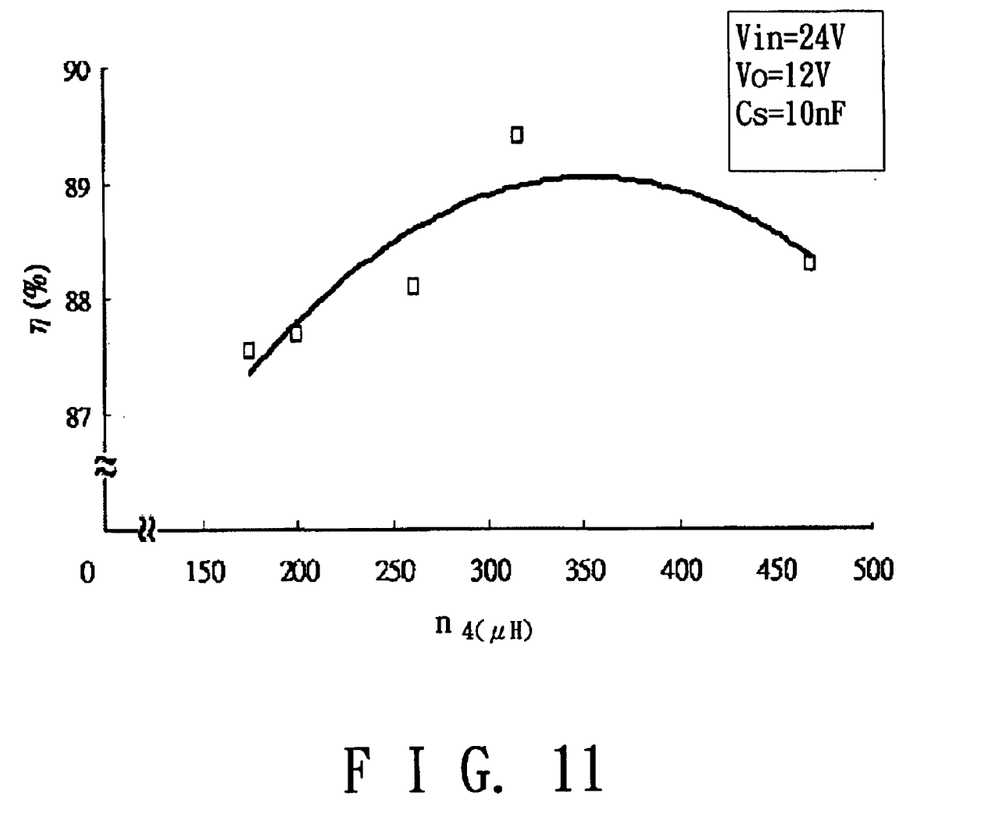
FIG. 11 is a plot illustrating conversion efficiency of the first preferred embodiment for different values of inductance of a primary winding of a snubber transformer.
Figure 12:
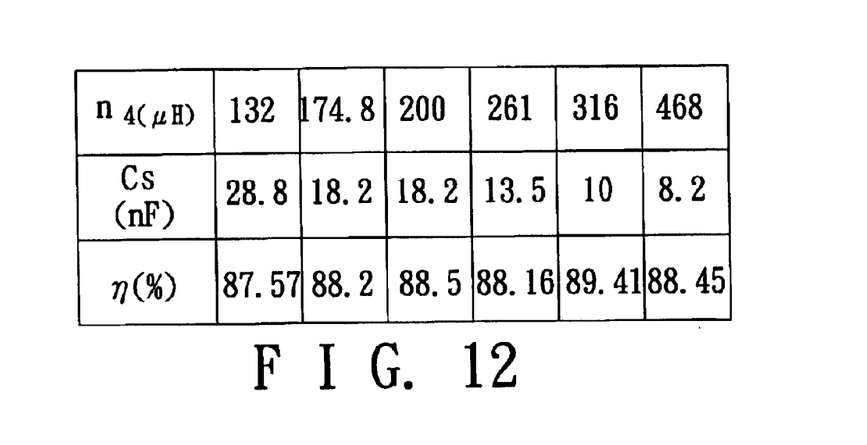
FIG. 12 is a table illustrating different values of inductance of the primary winding of the snubber transformer, capacitance of a snubber capacitor of the first preferred embodiment and conversion efficiencies corresponding thereto.

From experimental results, conversion efficiencies (η) of the power converter module 3 are demonstrated in FIGS. 8 to 12. The power converter module 3 of this embodiment was tested under the condition that switching frequency (fs), DC power source (Vin) and output voltage (Vo) are 80 kHz, 24V, and 12V, respectively. Referring to FIG. 8, under such condition, it can be seen that the maximum conversion efficiency (η) of 89.41% is obtained when output current (Io) equals 2 A. As illustrated in FIG. 9, when the inductance of the primary winding (n4) of the snubber transformer is fixed to 316 uH and the snubber capacitor (Cs) is varied, various characteristic curves are obtained. The maximum conversion efficiency (η) of 89.41% is achieved when the snubber capacitor (Cs) has a capacitance of 10 nF and the resonant frequency (fr) is 89.5 kHz. FIG. 10 shows that the maximum conversion efficiency (η) is obtained when the switching frequency (fs) is 80 kHz. FIG. 11 shows that the maximum conversion efficiency (η) is obtained when the inductance of the primary winding (n4) of the snubber transformer is 316 uH. FIG. 12 tabulates the values of the inductance of the primary winding (n4) of the snubber transformer, the capacitance of the snubber capacitor (Cs), and the conversion efficiencies (η) when the resonant frequency (fr) is varied between 80 to 90 kHz. As shown, the maximum efficiency (η) of 89.41% is obtained when capacitance of the snubber capacitor (Cs) is 10 nF, the inductance of the primary winding (n4) of the snubber transformer is 316 uH, the output current (Io) is 2 A, and the switching frequency (fs) is 80 kHz.

Figure 13:
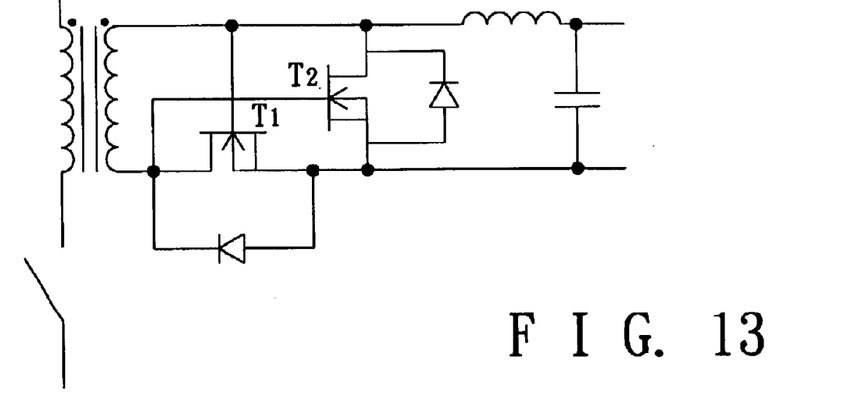
FIGS. 13 to 17 are schematic electrical circuit diagrams of rectifiers of the other preferred embodiments of the power converter module according to the present invention.
Figure 14:
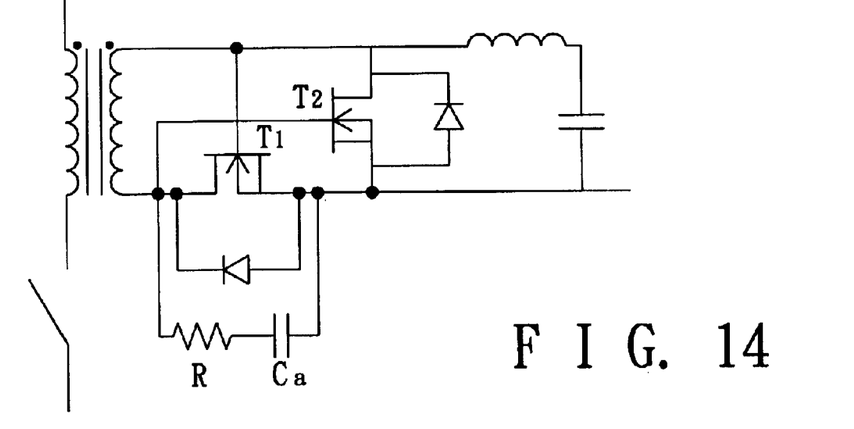
Figure 15:
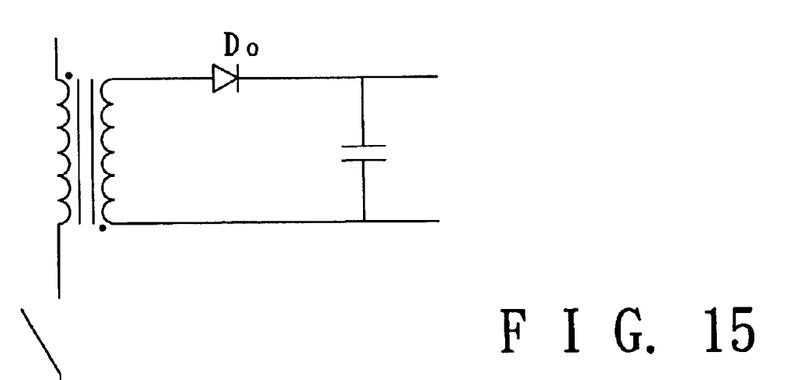
Figure 16:
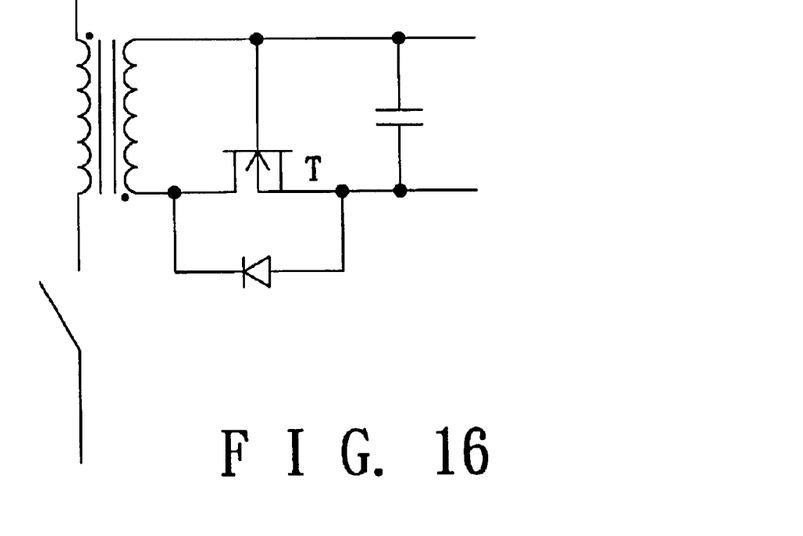
Figure 17:
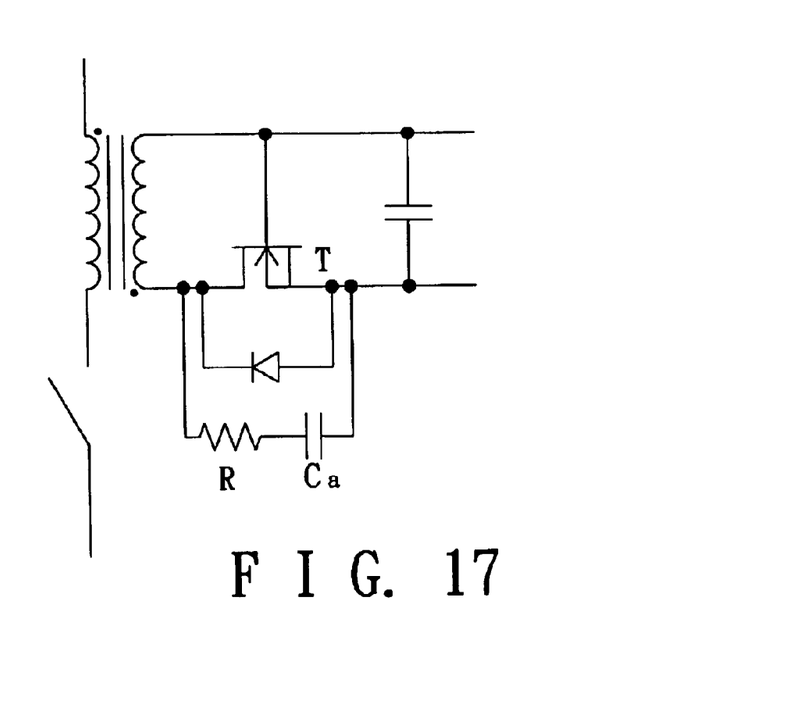

FIGS. 13 to 17 illustrate other preferred embodiments of the power converter module according to the present invention, which differ from the previous embodiment in the type of rectifier used to connect the secondary winding of the power transformer to the first load. FIG. 13 shows a forward synchronous rectifier. The difference between the forward rectifier of the previous embodiment and the forward synchronous rectifier of the present embodiment resides in that the diodes of the former are replaced by MOSFET transistors (T1, T2). The forward synchronous rectifier of FIG. 14 is substantially similar to that shown in FIG. 13, but with the addition of a series connection of a resistor (R) and a capacitor (Ca) that is connected in parallel to the transistor (T1). This minimizes oscillations and electromagnetic interference, which improves reset operation of the power transformer. FIG. 15 illustrates a fly back rectifier that includes a diode (Do). FIG. 16 shows a fly back synchronous rectifier. The difference between the fly back synchronous rectifier and the fly back rectifier of FIG. 15 resides in the inclusion of a MOSFET transistor (T). The fly back synchronous rectifier of FIG. 17 is substantially similar to that shown in FIG. 16, but with the addition of a series connection of a resistor (R) and a capacitor (Ca) that is connected in parallel to the MOSFET transistor (T).

Similarly, the snubber circuit 32, instead of using the fly back rectifier 35, can incorporate one of the rectifiers shown in FIGS. 13 to 17.

It has thus been shown that, in the power converter module of this invention, the voltage surge generated at the primary winding (n1) of the power transformer 31, at the instant when the first and second power switches (S1, S2) are opened, is absorbed by the snubber capacitor (Cs). The stored energy is then regenerated to the DC power source (Vin), and transferred to and stored in the primary winding (n4) of the snubber transformer 34. Subsequently, when the first and second power switches (S1, S2) are closed, all the energy stored in the snubber capacitor (Cs) is transferred to the primary winding (n4) of the snubber transformer 34. Thereafter, when the first and second power switches are opened (S1, S2) and the third power switch (S3) is closed, the energy in the primary winding (n4) of the snubber transformer 34 is released to the second load 5 through the fly back rectifier 35 at the secondary winding (n5) of the snubber transformer 34. As such, the surge energy, instead of being dissipated as in the prior art, is regenerated to the DC power source (Vin) and is provided to the second load 5. The conversion efficiency (η) of the power converter module 3 is improved accordingly.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A power converter module comprising:

a power transformer having a primary winding and a secondary winding adapted to be coupled electrically to a first load, said primary winding having first and second terminals connected electrically and respectively to first and second nodes;

a first power switch having a first switch terminal connected electrically to said second node, and a second switch terminal connected electrically to a third node, said first and third nodes being adapted to be coupled electrically to a power source; and an active snubber circuit for recovering surge energy, said active snubber circuit including
a snubber diode having a first diode terminal connected electrically to said first node and a second diode terminal connected electrically to a fourth node,
a snubber capacitor having a first capacitor terminal connected electrically to said second node, and a second capacitor terminal connected electrically to said fourth node,
a snubber transformer having a primary winding and a secondary winding adapted to be coupled electrically to a second load, said primary winding of said snubber transformer having a first terminal connected electrically to said fourth node and a second terminal connected electrically to a fifth node, and
a second power switch having a first switch terminal connected electrically to said fifth node and a second switch terminal connected electrically to said third node.

2. The power converter module as claimed in claim 1, further comprising a forward rectifier adapted to interconnect said secondary winding of said power transformer and the first load.

3. The power converter module as claimed in claim 1, further comprising a forward synchronous rectifier adapted to interconnect said secondary winding of said power transformer and the first load.

4. The power converter module as claimed in claim 1, further comprising a fly back rectifier adapted to interconnect said secondary winding of said power transformer and the first load.

5. The power converter module as claimed in claim 1, further comprising a fly back synchronous rectifier adapted to interconnect said secondary winding of said power transformer and the first load.

6. The power converter module as claimed in claim 1, wherein said active snubber circuit further includes:

a third power switch adapted to interconnect said secondary winding of said snubber transformer and the second load, said first, second and third power switches being concurrently controllable such that said first and second power switches are closed when said third power switch is opened, and such that said first and second power switches are opened when said third power switch is closed; and a load capacitor adapted to be connected across the second load.

7. The power converter module as claimed in claim 6, wherein at least one of said first, second and third power switches is a transistor switch.

8. The power converter module as claimed in claim 1, wherein said active snubber circuit further includes a forward rectifier adapted to interconnect said secondary winding of said snubber transformer and the second load.

9. The power converter module as claimed in claim 1, wherein said active snubber circuit further includes a forward synchronous rectifier adapted to interconnect said secondary winding of said snubber transformer and the second load.

10. The power converter module as claimed in claim 1, wherein said active snubber circuit further includes a fly back rectifier adapted to interconnect said secondary winding of said snubber transformer and the second load.

11. The power converter module as claimed in claim 1, wherein said active snubber circuit further includes a fly back synchronous rectifier adapted to interconnect said secondary winding of said snubber transformer and the second load.

12. An active snubber circuit for recovering surge energy in a power converter module, the power converter module including a power transformer having a primary winding and a secondary winding adapted to be coupled electrically to a first load, the primary winding having first and second terminals connected electrically and respectively to first and second nodes, the power converter module further including a first power switch having a first switch terminal connected electrically to the second node, and a second switch terminal connected electrically to a third node, the first and third nodes to be coupled electrically to a power source, said active snubber circuit comprising:

a snubber diode having a first diode terminal adapted to be connected electrically to the first node, and a second diode terminal connected electrically to a fourth node;

a snubber capacitor having a first capacitor terminal adapted to be connected electrically to the second node, and a second capacitor terminal connected electrically to the fourth node;

a snubber transformer having a primary winding and a secondary winding adapted to be coupled electrically to a second load, said primary winding of said snubber transformer having a first terminal connected electrically to said fourth node and a second terminal connected electrically to a fifth node; and a second power switch having a first switch terminal connected electrically to said fifth node and a second terminal adapted to be connected electrically to the third node.

13. The active snubber circuit as claimed in claim 12, further comprising:

a third power switch adapted to interconnect said secondary winding of said snubber transformer and the second load, said second and third power switches being configured for concurrent control with the first power switch such that said second power switch is opened and said third power switch is closed when the first power switch is opened, and such that said second power switch is closed and said third power switch is opened when the first power switch is closed; and a load capacitor adapted to be connected across the second load.

14. The active subber circuit as claimed in claim 13, wherein at least one of said second and third power switches is a transistor switch.

15. The active snubber circuit as claimed in claim 12, further comprising a forward rectifier adapted to interconnect said secondary winding of said snubber transformer and the second load.

16. The active snubber circuit as claimed in claim 12, further comprising a forward synchronous rectifier adapted to interconnect said secondary winding of said snubber transformer and the second load.

17. The active snubber circuit as claimed in claim 12, further comprising a fly back rectifier adapted to interconnect said secondary winding of said snubber transformer and the second load.

* * * * *